United States Patent Office 3,173,242
Patented Mar. 16, 1965

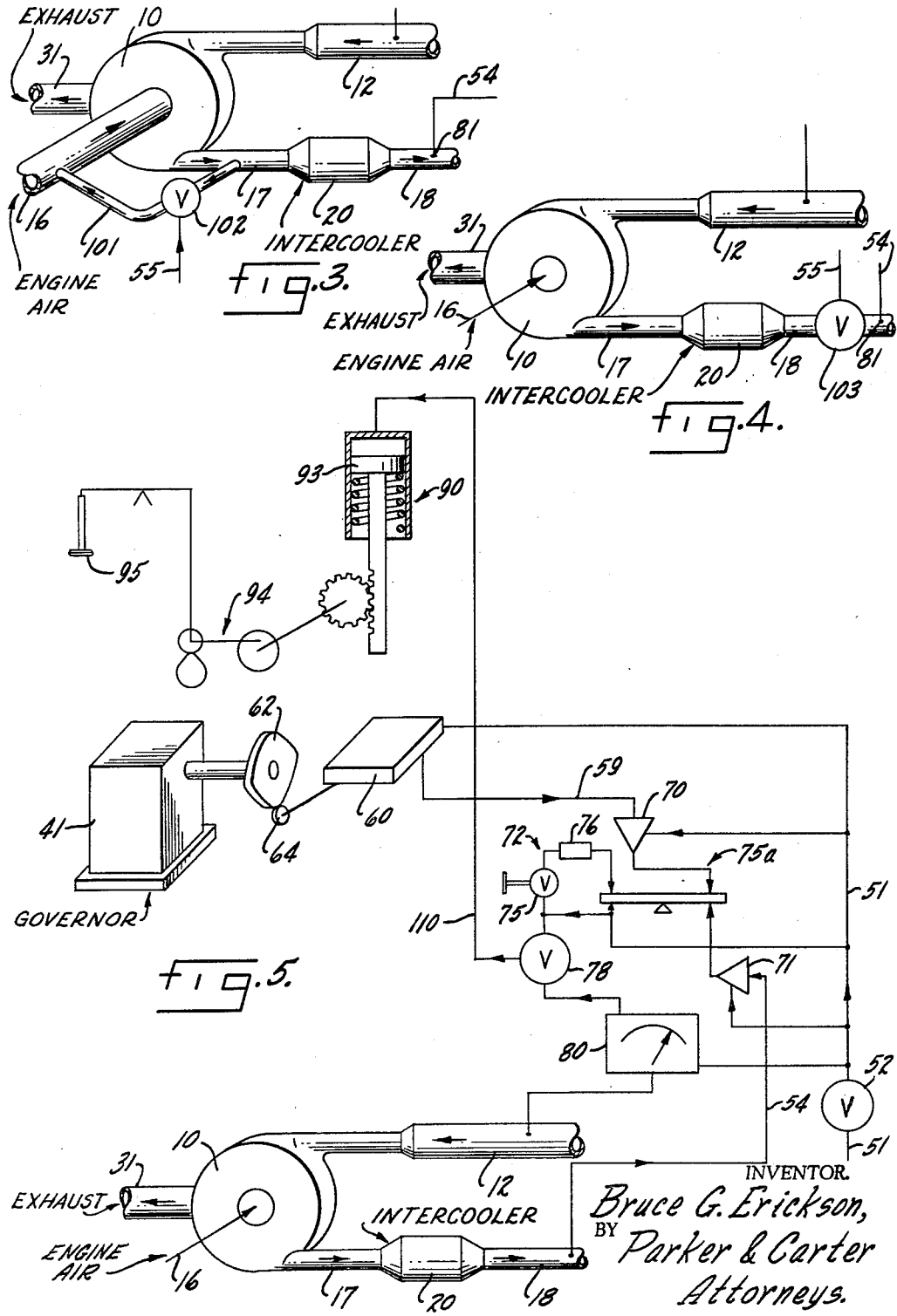

3,173,242
AIR-FUEL RATIO CONTROLS FOR ENGINES
Bruce G. Erickson, South Milwaukee, Wis., assignor to Nordberg Manufacturing Company, Milwaukee, Wis., a corporation of Wisconsin
Filed Jan. 10, 1962, Ser. No. 165,424
6 Claims. (Cl. 60—13)

This invention relates to a method and apparatus for controlling air-fuel ratios in engines, in particular, a method and apparatus in which the supercharger delivers varying amounts of air to the engine.

An object of this invention is a method and engine assembly adapted to efficiently and reliably control the air-fuel ratio in internal combustion engines.

Another object is a method and engine assembly wherein the amount of energy delivered to a supercharger is varied to correct air-fuel ratios.

Another object is a method and supercharged engine assembly wherein the energy available to the supercharger is trimmed according to the fuel load.

Another object is a method and engine assembly wherein the actual air and actual fuel are compared and the amount of air delivered by the supercharger is modified in response to such comparison.

Another object is a method and engine assembly wherein the actual air from a supercharger outlet is metered to the engine so that the actual air-fuel ratio may be controlled.

Another object is a method and engine assembly which maintains inlet air temperature as a more or less constant factor and where actual air-fuel ratio is controlled in response to pressure levels of the actual air.

Another object is a method and engine assembly wherein a comparison of actual air and actual fuel alters supercharger operation.

Another object is a method and engine assembly having a valve controlled bypass associated with the supercharger responsive to an output signal altered by a comparison of actual fuel and actual air.

Another object is an efficient air-fuel control system which operates over a wide range of fuel and air levels.

Another object is an air-fuel control system which is stable during steady-state operation and rapidly accepts load changes.

Another object is an air-fuel control system applicable to engine types which require optimum air-fuel ratios.

Another object is an air-fuel control system which is self-compensating for changes in ambient temperatures.

Another object is an air-fuel control system which provides controlled engine efficiency with engine deterioration.

Figure 1:
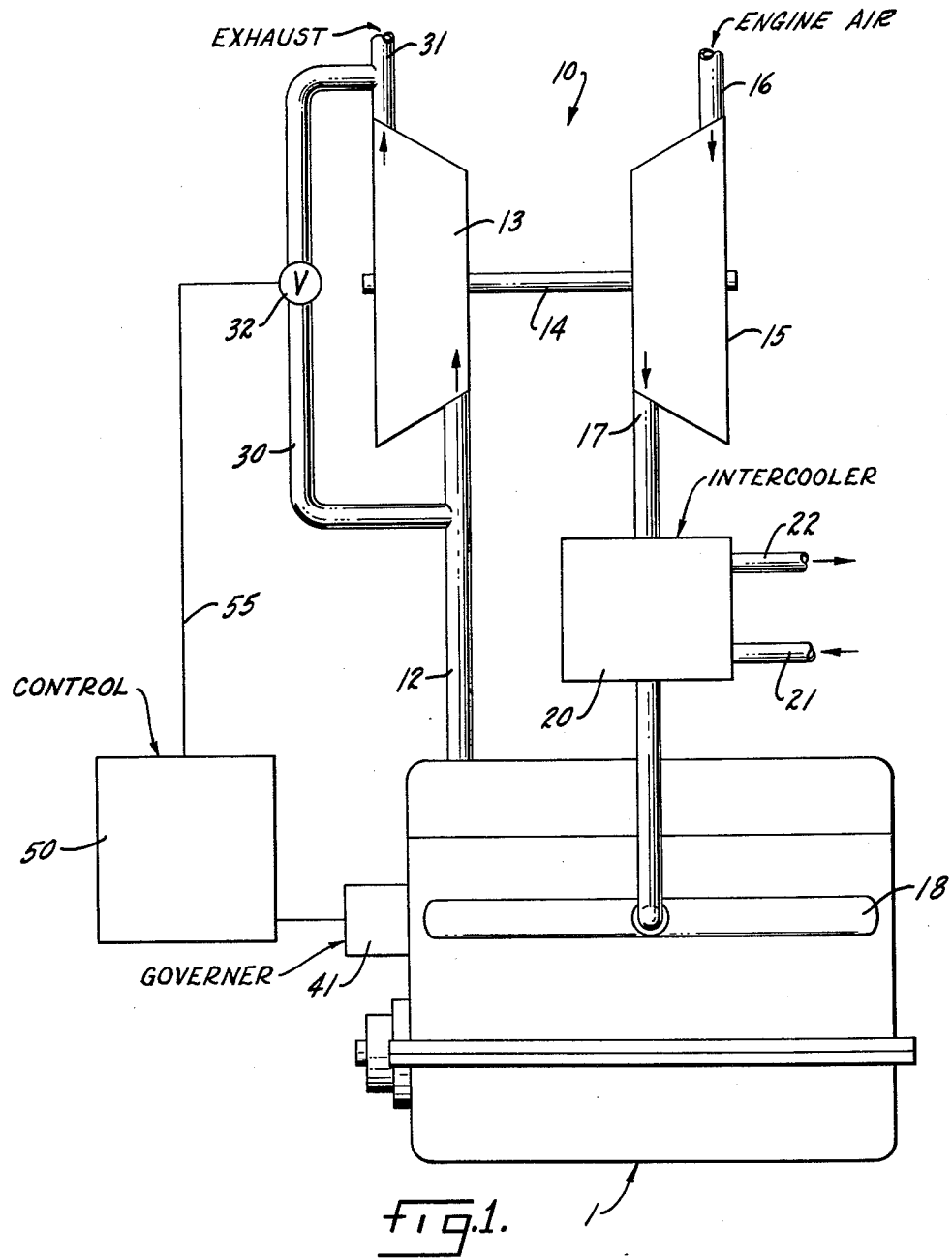
Figure 2:
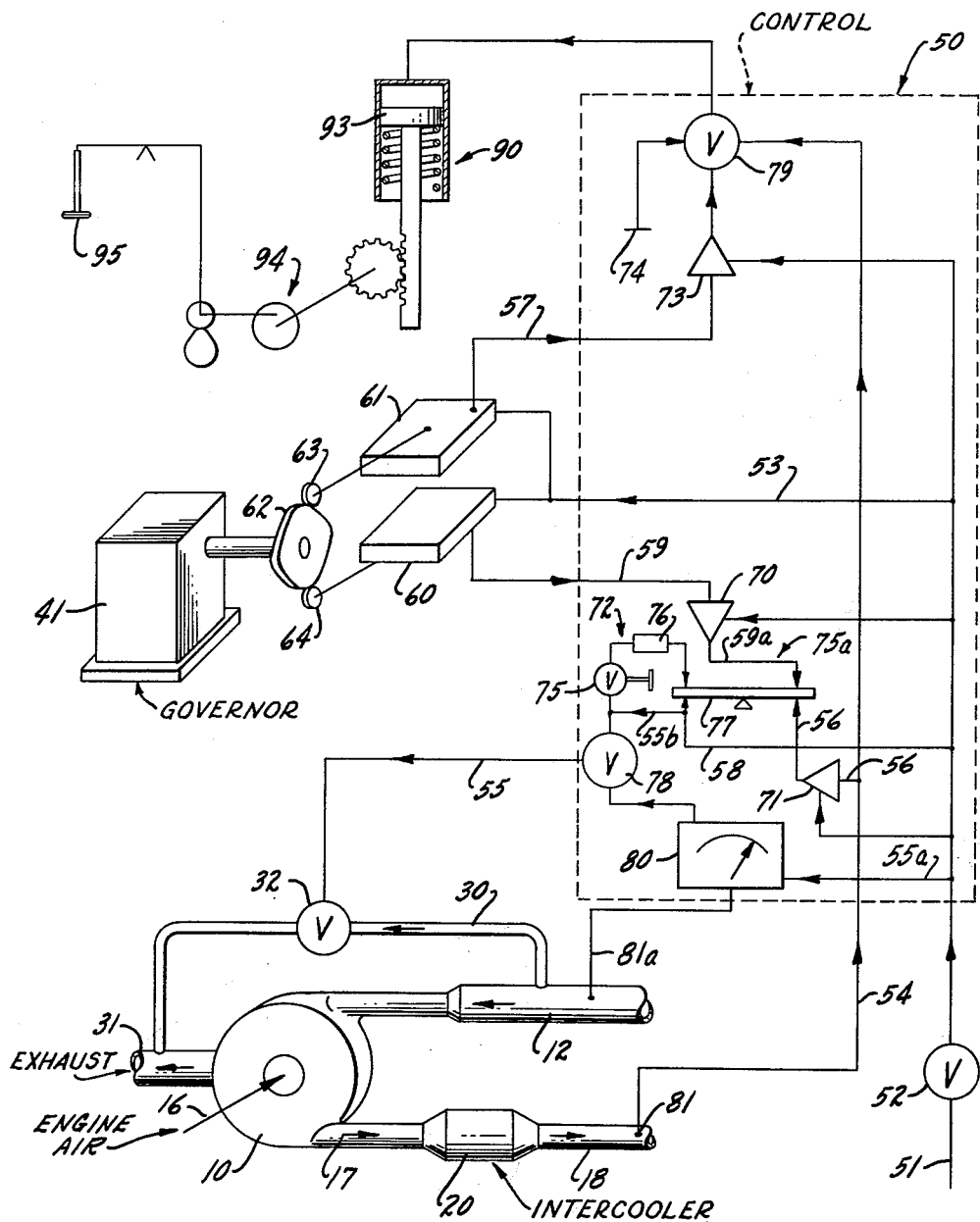
Figure 6:
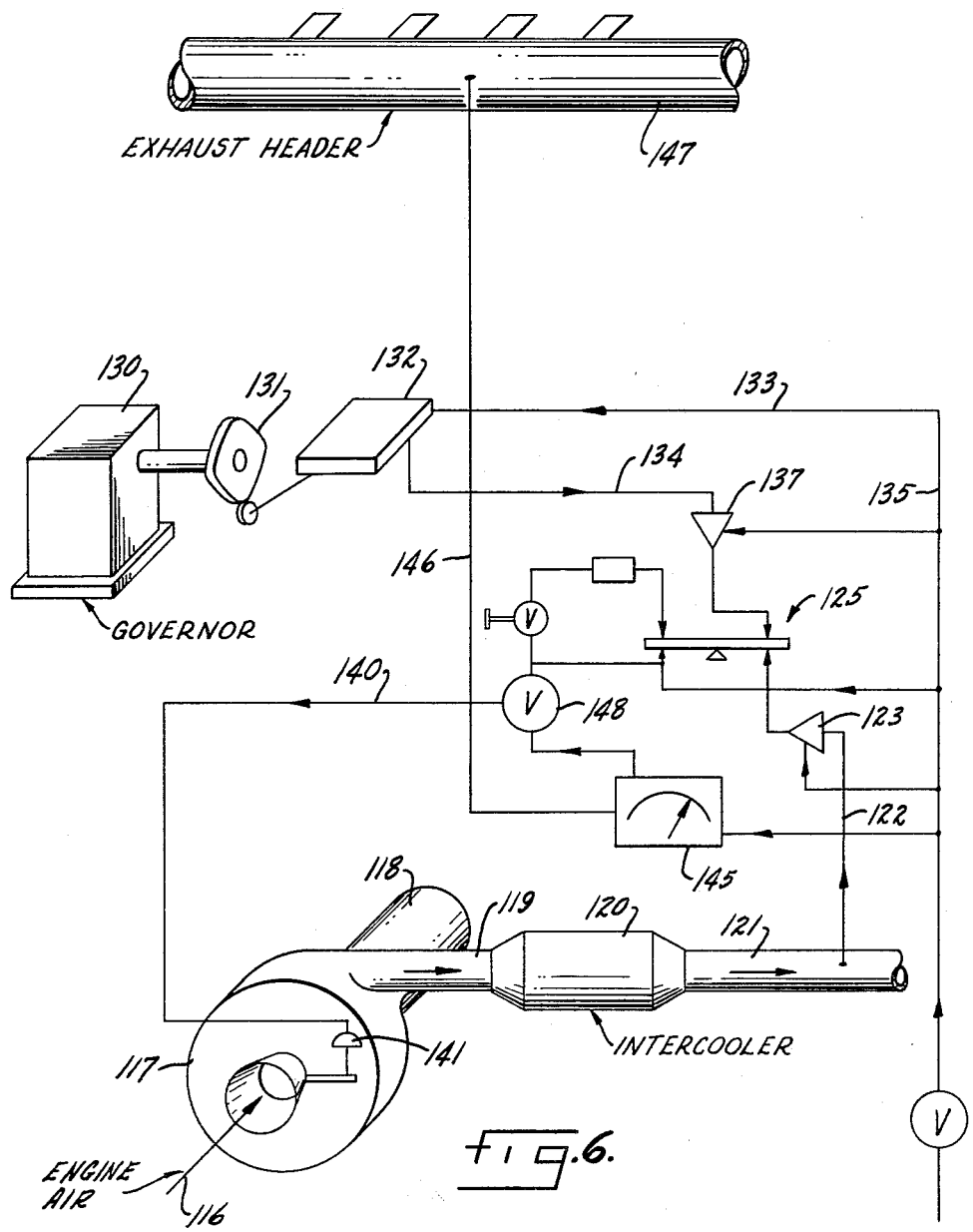

The foregoing objects are accomplished along with other objects which will become apparent from time to time in the accompanying specification and drawings wherein:

FIGURE 1 is a schematic and diagrammatic general view of the engine assembly,

FIGURE 2 is a diagrammatic and schematic view in greater detail of the control system included in FIGURE 1, FIGURE 3 is a diagrammatic and schematic view of a modified system to trim energy from a supercharger, FIGURE 4 is a diagrammatic and schematic view of another modified system to trim energy from a supercharger, FIGURE 5 is a diagrammatic and schematic view of an alternative control system, and FIGURE 6 is a diagrammatic and schematic view of another alternative control system.

In FIGURE 1 is shown the conventional assembly of an engine 1 and a supercharger 10, which is here shown as a turbocharger but which may be other types of superchargers. An exhaust pipe 12 extends from the engine 1 into the turbine 13 of the turbocharger. The exhaust gases from the engine drive the turbine 13. The turbine 13 drives a shaft 14 which drives a compressor 15. Air is drawn into the compressor by way of the inlet 16, is compressed, and is supplied through the outlet 17 to the inlet manifold at a pressure greater than atmospheric. An intercooler 20 may be placed between the inlet manifold and the outlet adjacent the compressor so that the air enters the engine at a generally constant controlled temperature. This will prevent fluctuating temperature from being a factor in the amount of air delivered to the engine. The details of the intercooler have not been shown since, in and of themselves, they are not a part of the invention. The intercooler may have a suitable inlet 21 and outlet 22 for a cooling fluid, such as water. Further, the intercooler may be suitably controlled, for example, by a valve in the water line to maintain a constant temperature air in the inlet manifold.

The air-fuel ratio of the mixture in the cylinders is controlled by comparing the air actually delivered to the engine by the supercharger to the theoretical amount required to maintain a theoretically perfect air-fuel ratio, relative to the fuel actually being delivered to the engine, and where a variation occurs, correction is made by altering supercharger operation to maintain the theoretically perfect amount. In the case of an exhaust driven supercharger, one way of doing this is by controlling the energy in the exhaust gases to the turbine. For example, this may be done by diverting the exhaust energy away from or around the turbine which may be referred to as trimming the energy away from the turbocharger. The form in FIGURE 1 is a bypass 30. Any exhaust gases or energy trimmed into the bypass 30 are vented out of the engine assembly through the exhaust 31. Situated in the bypass is a control or butterfly valve 32 which either closes the bypass or opens it somewhat. When the control valve 32 is closed, no exhaust gases will by-pass the supercharger and, conversely, a maximum amount of exhaust energy will be trimmed away from the turbocharger, when the valve is in a fully opened position. Thus, such trimming of exhaust gases away from the turbocharger will control the air actually delivered by the turbocharger to the inlet manifold 18.

The amount of inlet air actually delivered to the engine should be related to the amount of actual fuel or load. Accordingly, means are provided to sense the actual fuel to the engine and a signal corresponding to this sensed load is compared with a signal corresponding to the actual air. Any departure from a desired ratio for a given load alters a third signal which is delivered to the control or butterfly valve 32 to accordingly open or close the valve. The actual fuel, depending upon the load on the engine, is controlled by a governor 41 which is connected to the control indicated generally at 50. The control further senses the pressure of the actual air, and compares it with the actual fuel to the engine to establish the actual air-fuel ratio. The information is then fed back to the control valve 32 so that an adjustment may be made in the amount of exhaust to drive the supercharger. In this way, the actual air-fuel ratio is adjusted to the most efficient theoretical for a particular engine or particular load.

In FIGURE 2 the signal selected for illustration is an air signal from a compressed air supply which is fed by line 51 from a conventional source. A standard pressure valve 52 is placed in line 51 to control the magnitude of air pressure which is permitted to operate in the remainder of the line. For example, the pressure may vary in magnitude in the line 51 before reaching the position of the valve 52, but thereafter the pressure will be more or less constant, say, 100 p.s.i. This air signal enters line 53 and communicates with the governor position transmitters 60 and 61. The governor position transmitters move according to the fuel load delivered by the engine governor 41. The load or actual fuel set by the engine governor positions a cam 62 that, in turn, lowers or raises cam followers 63 and 64 which control the signals from the transmitters. Transmitter 60 sets the magnitude of the air signal relayed along lines 59 and 59a to be compared with the actual air.

The actual air is delivered from the turbocharger to the inlet manifold, and a pressure tap is placed in the outlet as at 81 so the pressure of the actual air from the turbocharger can be transmitted along lines 54 and 56.

This actual air is compared with the actual fuel in a proportional band controller with automatic reset, generally designated as 75a. This is a known instrument and can be considered as a comparator controller in which the signal from transmitter 60 is compared with the air manifold signal in line 56. The signal in line 59 may be considered as a set-point signal which is scheduled by the governor. The signal in line 56 may be considered as the feedback signal tapped from the air manifold. For a given set-point signal, there is a selected feedback signal which indicates agreement between a desired air and fuel ratio. Any disagreement or error between set-point and feedback is corrected by the controller and then by the automatic reset shown generally at 72. The error will cause the balance 77 to alter the control output signal in line 55b. Such altered signal is also bled through needle valve 75 into volume chamber 76 and then onto balance 77. A steady state is achieved when the set-point signal equals the feedback signal and the automatic reset signal equals the control output signal. The automatic reset signal assures that no error will occur between position transmitter signal and air manifold signal at steady state conditions.

A group of bias relay valves such as at 70, 71 and 73 may be placed in the control system to move the signal into a more usable range and also to provide adjustability in the range.

The control system 50 may have a temperature controller 80 which receives temperature information from tap 81 in exhaust 12. The controller is in the nature of a safety override, that is, at high temperatures in the exhaust, the exhaust gases are fully trimmed away from the turbocharger and vented to the atmosphere. This is done by a signal through diverting relay valve 78 and then sending the signal through line 55 to the control valve 32.

A link shaft control system generally designated as 90 may also be used in the system. Such a link shaft control system may take any one of numerous forms to control the timing of the engine cylinder valves. An air signal from the supply source will have its magnitude altered by transmitter 61 and is transmitted along line 57 through a bias relay valve 73 and valve 79 over to the link shaft control where a pressure responsive piston 93 is raised or lowered to actuate a linkage generally shown as 94 to thereby alter the timing of a valve 95. The automatic link shaft operation may be alternatively controlled by the air manifold signal conveyed along line 54 to the valve 79. It is understood that the link shaft position may also be manually set from a panel mounted pressure regulator.

Valve 79 may be controlled by a signal from source 74, which could be manual, for example, so that either line 54 or line 57 is connected to the linkshaft control 90.

Means other than the hot by-pass of FIGURE 2 may be selected to trim available air in the inlet manifold. A cold by-pass 101 may connect the air inlet 16 and the outlet 17 as shown in FIGURE 3. Other parts and components associated with the supercharger may be the same as in FIGURE 2. The by-pass 101 has a valve 102 which is controlled by an air signal from line 55. The air signal is tempered in the manner described, and opens or closes the valve 102 to recycle more or less air back to the compressor inlet.

Another approach is by throttling the outlet air from the compressor. In FIGURE 4, a throttle valve 103 is shown in the inlet manifold 18, and the valve is also controlled by an air signal from line 55 to open and close the valve 103. The throttle may be ahead of or behind the intercooler 20.

The turbocharger performance, and therefore the air-fuel ratio, may also be controlled by adjustment of valve timing through the link shaft control.

For example, an air signal from inlet manifold 18 is conveyed along line 54 through bias relay 71 to the controller where the feedback signal is compared with the set-point signal delivered along line 59 as scheduled by position transmitter 60. The altered output signal travels through the diverting relay valve 78 and along line 110 to the link shaft control 99. The valve 95 will have its timing changed to entrap more or less air and pass less or more air during scavenging in accordance with the output signal changing the link shaft position. This affects the temperature of the exhaust which in turn trims the turbocharger.

The air-fuel ratio control may be used to trim a motor driven blower alone or in series wtih a turbocharger. In FIGURE 6, the amount of engine air delivered to the motor driven blower is metered by inlet guide vanes which, in turn, are responsive to a signal set by the air-fuel control system. Engine air 116 is delivered to a centrifugal blower 117 which is driven by a motor 118. The compressed air passes from outlet 119, through an intercooler 120 to the manifold 121 at constant temperature. A signal corresponding to the pressure of the air in the outlet 121 is conveyed along line 122 through bias relay valve 123 and compared with a set-point signal in the controller 125. The set-point signal indicates fuel load from governor 130. The governor sets cam 131 which controls transmitter 132. The transmitter alters the magnitude of a signal delivered along line 133 from a supply line 135. The altered signal is sent to the controller 125 along line 134, and such signal may travel through an optionally placed bias relay valve 137. Any error between the set-point signal indicating load and the feedback signal indicating manifold air affects the output signal in line 140 in the manner already described. The output signal travels to the inlet guide vane operator 141 which positions the guide vane to meter the amount of air entering the centrifugal blower.

A temperature controller 145 may be placed in the system to shut down or modify the operation of the blower when exhaust temperature gets too high. A tap 146 from the exhaust header 147 feeds temperature information to the controller, and at too high temperatures, a signal will be conveyed from the controller, through diverting relay vlave 148, along line 140 and then to the inlet guide vane operator 141.

The use, operation and function of the invention are as follows:

The reasons for controlling air-fuel ratio in all types of engines are well known. It is particularly important in spark fired gas engines since the engine may quit if the mixture is too lean or too rich. In a diesel or dual fuel engine, it will at most times result in poor combustion and bad fuel economy. But such an engine is less liable to stop. It should be understood that my invention may be applied to diesel, duel fuel, spark fired engines, two cycle, four cycle or otherwise.

I have shown my control applied to an intercooled engine, but it should be understood that this is not necessary. The invention might as well be applied to a non-intercooled engine, in which case a pressure tap in the inlet manifold of the control probably would not be adequate. By using an intercooler of the type that gives a constant outlet temperature air in the inlet manifold regardless of load variations, the temperature of the air being consumed by the engine is factored out of consideration. Since temperature is constant, my sensing device only needs to take air pressure into consideration. It will be understood that I am fundamentally concerned with the density of the air that the engine is consuming since air-fuel ratio is on a weight basis. But by using a constant temperature intercooler, pressure variations reflect density changes.

When my control is applied to a non-intercooled engine, I may use both temperature and pressure sensing devices in the inlet manifold, or any suitable arrangement which will sense air density.

In extremely cold climates, instead of an intercooler, the engine might be equipped with a heater which would give constant temperature in the inlet manifold or otherwise. The point is that the invention is not restricted to use with or on an engine having an intercooler.

In my control, I sense the fuel that is being supplied to the engine. In the particular form shown, I have shown this as sensing governor position, which directly indicates the quantity of fuel being supplied at any instant. But it should be understood that I may sense any other varying factor on the engine which indicates fuel rate. In a diesel engine, since the governor sets fuel rack position, I might sense the position of the fuel rack. Some factors react more quickly to load change than others, and I prefer to use a fast reacting factor.

The same is true of the density of the air being supplied by the supercharger. I show an arrangement for sensing inlet manifold pressure, but I might sense at a different point, for example, turbocharger speed. I do not recommend this, however, since the density of the air in the inlet manifold is about as close to actual cylinder conditions as you can get.

Basically, the system involves sensing a fast reacting fuel factor on the engine, such as governor position. This is compared to a fast reacting air factor, such as inlet manifold pressure. This ratio or comparison is, in turn, compared to a theoretically perfect air-fuel ratio. Where a variation exists from the theoretical, a correction is made which involves altering the operation of the supercharger. I have shown a number of ways in which supercharger operation may be altered. This may be done directly at the supercharger, for example, the guide vane adjustment of FIGURE 6, the hot bypass of FIGURE 2, the cold bypass of FIGURE 3, etc., or it may be done internally in the engine, for example, altering valve timing, as in FIGURE 5, which alters the amount of air that is directly passed through the engine during scavenging and is not available during combustion to be turned into energy to drive the turbocharger. Changing valve timing in this situation is merely an indirect way of altering turbocharger operation and it is not necessarily intended as an alteration of engine performance which, if it occurs, is incidental. For example, the system might be used in conjunction with the engine operating cycles shown in U.S. Patent No. 2,670,595, issued March 2, 1954, and U.S. Patent No. 2,773,490, issued December 11, 1956, where valve timing is changed for certain reasons.

While I have shown an air operated sensing and control system, it should be understood that it might be hydraulic, electric, mechanical or otherwise.

I have not shown a crankshaft driven blower, but it should be understood that the system may be used with an engine having such. For example, I might vary the slip in a coupling to alter the blower operation to thereby correct the air-fuel ratio.

One of the advantages of my system is that the theoretically perfect air-fuel ratio I am shooting for may be the same throughout the entire load range. Or it may vary somewhat. For example, I may find that particular size and type of engine will operate more smoothly and with better fuel consumption at, say, half load with a slightly different air-fuel ratio than at full load. Or the ratio at all loads may be the same. In any event, my system may be made to accommodate itself to the peculiarities of particular engines.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

I claim:

1. In an internal combustion engine, a supercharger connected to supply inlet air to the engine, an intercooler between the supercharger and the engine to supply air to the engine at an approximately constant temperature at all loads, a governor connected to the engine and controlling the fuel supplied to the engine in accordance with load on the engine, means for sensing the actual pressure of the air supplied to the engine by the supercharger, a cam profile movably responsive to governor position in accordance with load on the engine, the cam profile being contoured in accordance with the desired inlet air pressure to provide the best air-fuel ratio at each and every load for the most efficient operation of the engine at each and every load, means for sensing the cam profile to thus reflect the desired inlet air pressure at each load, means for comparing the thus sensed actual air pressure to the thus sensed desired air pressure, and means for altering the operation of the supercharger to change the actual inlet air pressure to the desired inlet air pressure if the actual air pressure differs from the desired air pressure to thereby provide an air-fuel ratio mixture at each and every load on the engine which is matched to the previously determined most efficient operation of the engine.

2. The structure of claim 1 further characterized in that the means for altering the operation of the supercharger includes means for varying the operation of the valves of the engine so that more or less air will be available for the combustion process to thereby change the energy level of the exhaust gases, the supercharger being driven by the exhaust gases.

3. The structure of claim 1 further characterized in that the means for altering the operation of the supercharger includes means for throttling the output air from the supercharger compressor.

4. The structure of claim 1 further characterized in that the supercharger is driven by the exhaust gases, and the means for altering the operation of the supercharger includes a by-pass for exhaust gases around the turbine of the supercharger, and means for controlling the flow through the by-pass so that more or less exhaust gas will be supplied from the engine to the supercharger turbine.

5. The structure of claim 1 further characterized in that the means for altering the operation of the supercharger includes a by-pass around the supercharger compressor and means for controlling the by-pass so that more or less air from the high side of the compressor may be returned to the low side.

6. The structure of claim 1 further characterized in that the means for altering the operation of the supercharger includes means for throttling the intake to the supercharger compressor.

References Cited in the file of this patent

UNITED STATES PATENTS

| | | |
|---|---|---|
| Re. 25,103 | Evers | Dec. 26, 1961 |
| 1,281,216 | Schellens | Oct. 8, 1918 |
| 2,193,114 | Seippel | Mar. 12, 1940 |
| 2,500,234 | Bates | Mar. 14, 1950 |
| 2,656,675 | Coar | Oct. 27, 1953 |
| 2,682,866 | Rhoades | July 6, 1954 |
| 2,792,685 | Constantino et al. | May 21, 1957 |
| 2,820,339 | Grieshaber et al. | Jan. 21, 1958 |
| 2,931,168 | Alexander et al. | Apr. 5, 1960 |
| 3,018,617 | Kelgard | Jan. 30, 1962 |